Nov. 17, 1953 V. L. BARR 2,659,637
ROLLER BEARING FOR COMPENSATING SHAFT MISALIGNMENT
Filed June 14, 1950 2 Sheets-Sheet 1
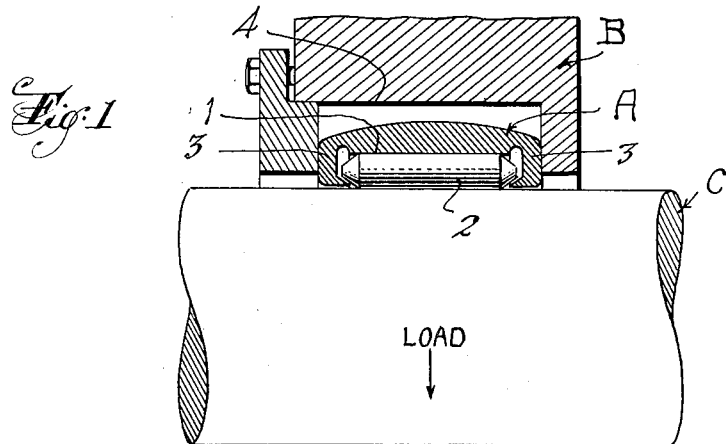
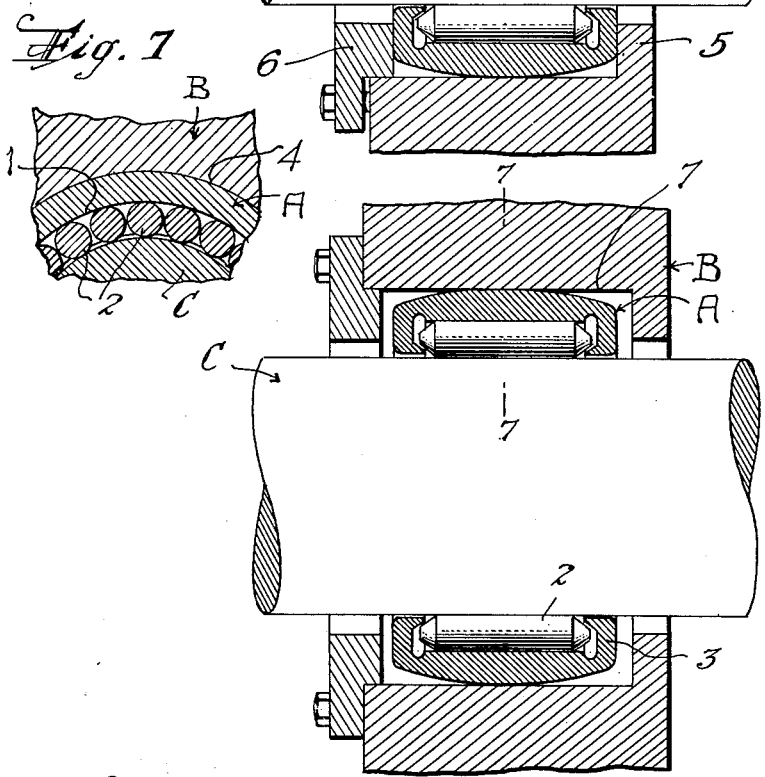
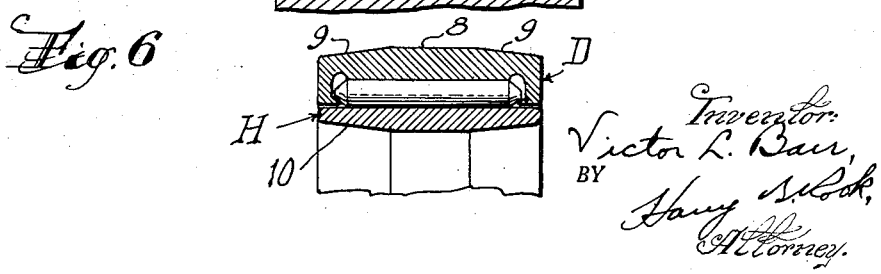

Nov. 17, 1953  V. L. BARR  2,659,637
ROLLER BEARING FOR COMPENSATING SHAFT MISALIGNMENT
Filed June 14, 1950  2 Sheets-Sheet 2
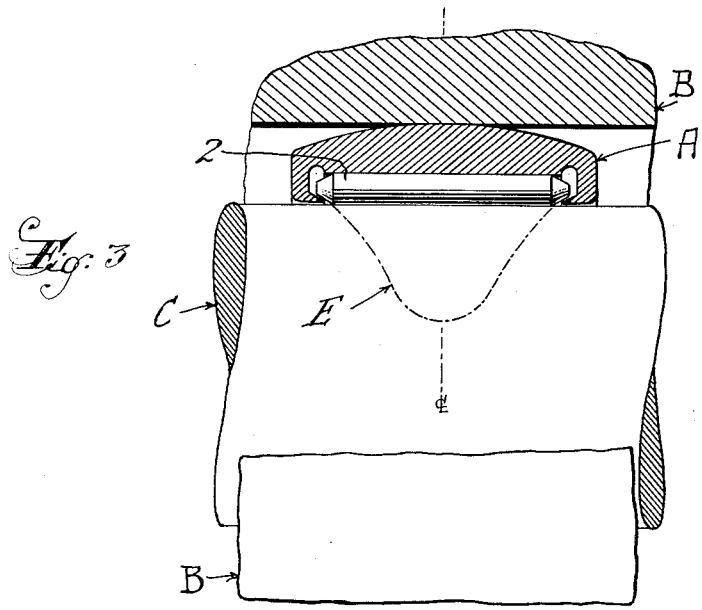
Fig. 3
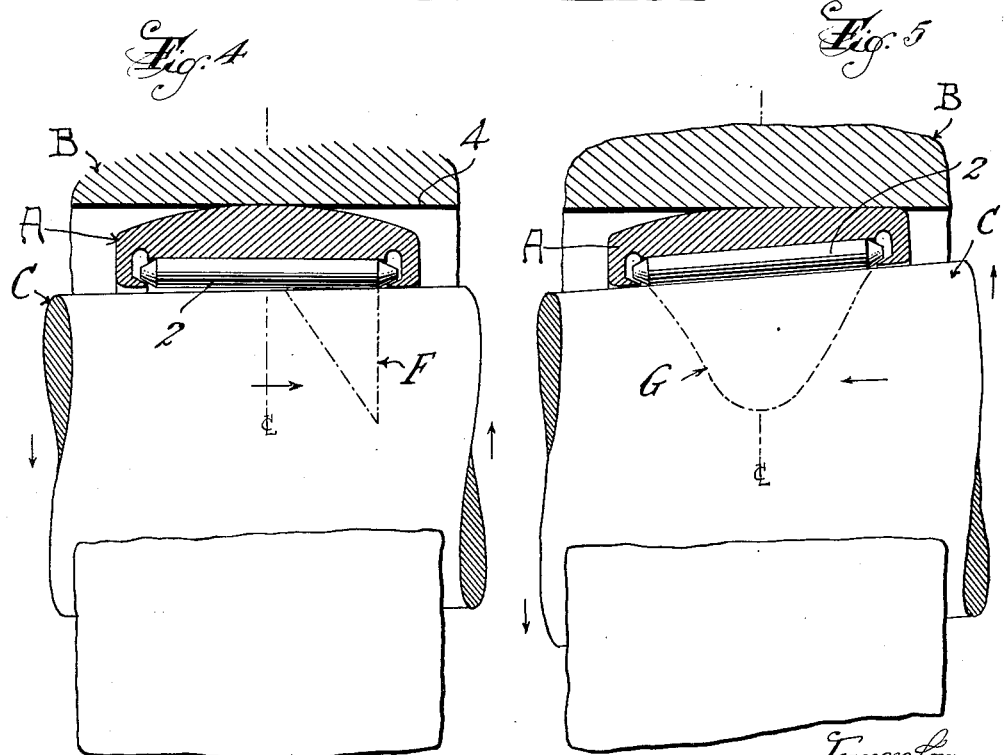
Fig. 4
Fig. 5
Inventor:
Victor L. Barr
BY
Harry B. Cook
Attorney Patented Nov. 17, 1953

2,659,637

UNITED STATES PATENT OFFICE 2,659,637

ROLLER BEARING FOR COMPENSATING SHAFT MISALIGNMENT

Victor L. Barr, Philadelphia, Pa., assignor to Roller Bearing Company of America, Trenton, N. J., a corporation of New Jersey Application June 14, 1950, Serial No. 168,103

5 Claims. (Cl. 308—207)

1

This invention relates in general to roller bearings, particularly cageless needle bearings, of the type including at least one race ring having roller retaining flanges at its ends and a plurality of rollers to roll in said race ring and held against both endwise and lateral displacement therefrom, for example of the type described in United States Patent No. 2,197,351.

The rollers of such roller bearings, when in use, are disposed between two race rings or between a race ring and a shaft or journal or other bearing element with diametrically disposed portions of the periphery of the roller engaging respectively the race ways in said race rings or in the race ring and shaft, journal or bearing housing. When misalignment of the shaft, shaft deflection or off-center loading of the shaft occurs, the major portion of the load is imposed upon the rollers adjacent one end portion thereof instead of being uniformly distributed throughout the length of the rollers, which causes rapid wear of the rollers and consequent short life for the bearing.

Therefore, one object of the present invention is to provide a novel and improved roller bearing of the general character described which shall embody novel and improved features of construction to eliminate or reduce such end loading of the rollers and to cause the load to be carried by the rollers substantially uniformly throughout their lengths in case of misalignment of the shaft, shaft deflection or off-center loading of the shaft.

In roller bearings of this type, especially when under a heavy load, the rollers skew or get out of parallel with the shaft so that they contact the outer race at their ends and the inner race at their centers, which tends to bend the rollers; and another object of the invention is to provide such a roller bearing wherein one or both of the race rings shall have their circumferential peripheral portions crowned along their transverse medial planes or relieved adjacent their ends to permit a deformation of the end portions of the race ring upon shaft misalignment, deflection or off-center loading or upon skewing of the rollers to transfer the load from the ends toward the center of the length of the roller.

Other objects, advantages and results of the invention will be brought out by the following description in conjunction with the accompanying drawing in which Figure 1 is a longitudinal vertical sectional view through a bearing housing having a roller bearing constructed in accordance with the invention tightly clamped therein at the ends of the race ring and with clearance between the periphery of the race ring and the walls of the housing;

Figure 2 is a similar view showing the race ring secured in the bearing housing with a press fit between the periphery of the race ring and the walls of the housing;

Figure 3 is a schematic sectional view through a bearing constructed in accordance with the invention and including a stress diagram showing the distribution of contact stress between a roller and the outer race ring and shaft when perfect alignment of the shaft exists;

Figure 4 is a similar view showing distribution of the roller contact stress when shaft misalignment or deflection is present and before deformation of the outer race ring;

Figure 5 is a view similar to Figure 4 showing the parts after the outer race ring has been deflected and showing the distribution of the load throughout the length of the roller;

Figure 6 is a fragmentary transverse vertical sectional view through a roller bearing of the type including both inner and outer race rings; and Figure 7 is a fragmentary transverse vertical sectional view approximately on the plane of the line 7—7 of Figure 2.

Specifically describing the invention illustrated in Figures 1 to 5 inclusive, the roller bearing is shown as comprising only an outer race ring A which has a channel-shaped race way 1 and rollers 2 at opposite ends of which are end roller-retaining flanges 3 which are shown integral with the ring and might be separably attached thereto.

In Figure 1 the roller bearing is shown as mounted in a recess 4 in a bearing housing or journal B with a substantial clearance between the outer periphery of the race ring and the walls of the recess 4, but with the bearing firmly clamped endwise in the housing between a fixed end wall 5 and a removable end wall 6 of the recess 4.

Figure 2 shows another manner of mounting the bearing in a housing, the bearing in this case being secured in the recess 7 with its ends free but with its periphery pressed into tight contact with the walls of the housing recess 7.

In both cases, the race ring A has its outer periphery crowned or increasing in diameter from each end toward the transverse medial plane of the ring, or putting it another way, the outer surface of the end portions of the ring are relieved, tapered or reduced in diameter. In Figure 1 the crowning is in the form of a continuous convex curve from one end of the ring to the other, while in Figure 6 the medial portion of the outer periphery of the outer race ring D is cylindrical as indicated at 8 while the end portions are tapered at 9. In both forms of the bearing, the outer race ring is of greater diameter centrally of its length than it is at its ends.

Under normal and ideal conditions, when there is no misalignment, deflection or off-center loading of the shaft C, the load on the bearing is distributed uniformly throughout the lengths of the rollers as shown by the stress diagram that is represented by the dot and dash line E in Figure 3.

When shaft misalignment, displacement or off-center loading occurs, initially the load is imposed upon the rollers at one end thereof as indicated by the stress diagram line F in Figure 4, but in accordance with the invention the race ring is deformed as shown in Figure 5 so that the load is distributed substantially uniformly throughout the length of the rollers as shown by the stress diagram line G.

It should be understood that in actual practice the shaft will slightly bend or flex, but the deflection is so slight, of the order of one-thousandth (.001) of an inch, that in the drawings the shafts have been illustrated as straight under all conditions; and furthermore it will be understood that the deflections and deformations have been greatly exaggerated in the drawings for the purpose of clarity. Moreover, the spaces between the race ring and the circumferential wall of the recess in Figure 1, as well as the spaces between the ends of the race ring and the end walls of the recess in the bearing housing of Figure 2, are greatly exaggerated and illustrated only to show that the race ring does not have a press fit engagement with the circumferential wall of the recess 4 in Figure 1 and is not held at its ends between end walls of the recess 7 in Figure 2. In other words these illustrations are primarily to show that movement of the race ring as a whole in the bearing housing may be prevented either by firmly clamping the race ring at its ends as shown in Figure 1 or by forcing the race ring into tight contact with the circumferential wall of the housing as shown in Figure 2.

The thickness of the race rings and the amount of relief or crowning depends upon the size of the bearing, but it has been found that relieving the ends of the race rings about one-thousandth (.001) of an inch per inch of diameter of the race ring, which is approximately one-half a degree of taper on the outer diameter, will give satisfactory results in needle bearings.

If desired the inner race ring of the bearing may also be crowned or relieved at its ends as shown in Figure 6 where the inner race ring H has its end portions tapered as indicated at 10.

In all forms of the invention, it has been found that the bearing embodying the invention operates with substantially no thrust as the result of end loading of the rollers so that the life of the bearing is many times that of the heretofore known types of bearings operating under the same conditions. Moreover, the deformation of the race ring reduces or prevents the bending of rollers as the result of skewing of the rollers, such deflection causing the transfer toward the centers of the lengths of the rollers of the load that normally occurs at the roller ends as the result of skewing of the rollers.

While I have shown and described the invention as embodied in certain forms of bearings and in certain structural details, it should be understood that the invention may be utilized in connection with other bearings and the construction of the bearing may be modified, all within the spirit and scope of the invention. The essence of the invention resides in the race ring the thickness of which from the race way to the peripheral surface of the ring gradually increases from the ends of the ring toward the center of the length thereof, so that the end portions of the ring may be deflected to compensate for misalignment or displacement of the shaft and to cause distribution of the load substantially uniformly throughout the lengths of the rollers. The peripheral surface of the race ring may increase in diameter from each end toward the center of the length of the race ring or be convexly curved longitudinally, or axially of the race ring, as shown in Figures 1 to 5 inclusive, or the end portions of the peripheral surface of the race ring may be tapered as shown in Figure 6. In all forms of the invention the race ring is firmly held against bodily movement, i. e., movement of the ring as a whole and particularly against rocking movement in the bearing housing, either by clamping as shown in Figure 1 or by a press fit as shown in Figure 2.

I claim:

1. A bearing comprising a race ring having a cylindrical race way and rollers cooperative with the race way, a peripheral surface of the race ring being relieved from a zone intermediate its length to each end of the ring, a shaft extending through the bearing, a bearing housing having a recess within which said race ring is firmly secured against rocking movement with clearance between the end portions of the outer periphery of the race ring and the wall of said recess so that the end portions of said race ring will be deformed in a radial direction upon misalignment or deflection or off-center loading of said shaft, thereby to partially relieve the ends of the rollers of the load on the bearing at the zone of deflection and transferring the load toward the center of the length of the rollers.

2. A bearing comprising a race ring having a cylindrical race way and rollers cooperative with the race way, the outer peripheral surface of the race ring gradually increasing in diameter from each end of the ring toward the center of the length of the ring, and a bearing housing having a recess within which said race ring is firmly secured against rocking movement with clearance between the end portions of the outer periphery of the race ring and the wall of said recess so that the end portions of said race ring will be deformed in a radial direction upon misalignment or deflection or off-center loading of a shaft or another race ring fitted in the bearing.

3. A roller bearing as defined in claim 2 wherein said race ring is secured in said bearing housing with the transverse medial portion of its outer periphery in "press fit" contact with the walls of said recess, and with the end portions of the race ring free from contact with said housing.

4. A bearing as defined in claim 3 wherein said medial portion of the peripheral surface of the race ring is cylindrical and the end portions of the outer peripheral surface of the race ring are conically tapered.

5. A roller bearing as defined in claim 2 wherein said race ring is firmly clamped at its ends in said housing and with clearance between the end portions of the outer periphery of the race ring and the wall of said recess.

VICTOR L. BARR.

References Cited in the file of this patent

UNITED STATES PATENTS

| Number | Name | Date |
|---|---|---|
| 558,642 | Fayol | Apr. 21, 1896 |
| 1,187,511 | Delk | June 20, 1916 |
| 1,778,391 | Kendall | Oct. 14, 1930 |
| 1,995,408 | Wallgren | Mar. 26, 1935 |
| 2,259,325 | Robinson | Oct. 14, 1941 |
| 2,388,129 | Eisenbeis | Oct. 30, 1945 |

FOREIGN PATENTS

| Number | Country | Date |
|---|---|---|
| 148,476 | Great Britain | Dec. 16, 1920 |
| 354,728 | Italy | Dec. 6, 1937 |
| 445,541 | Germany | June 14, 1927 |